Patented May 1, 1928.

1,668,009

UNITED STATES PATENT OFFICE.

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

FLUID-PRESSURE BRAKE.

Application filed June 11, 1926. Serial No. 115,200.

This invention relates to fluid pressure brakes, and more particularly to means for maintaining the pressure in the brake pipe.

It has heretofore been proposed to provide a brake equipment in which the brake cylinder pressure is maintained against leakage at a predetermined pressure corresponding with the degree the brake pipe pressure is reduced, and means are also provided for maintaining the brake pipe pressure at the predetermined reduced degree. The maintaining of the brake pipe pressure is controlled by the operation of the brake valve device, the brake valve device being first turned to service application position to effect the desired reduction in brake pipe pressure and then to lap position, in which the brake pipe pressure maintaining means is cut into action.

When brakes of other types, not requiring the maintaining feature, are mixed in the train with brakes of the pressure maintaining type, it may be desirable to operate the brakes without the brake pipe maintaining feature functioning.

The principal object of my invention is to provide a brake valve device adapted to be operated either so as to maintain the brake pipe pressure or so that the maintaining feature is cut out of action.

In the accompanying drawing; Fig. 1 is a diagrammatic view of a fluid pressure brake equipment embodying my invention, and showing the brake valve device in the brake pipe pressure maintaining position; Fig. 2 a sectional view of the brake valve device, showing the rotary valve in normal lap position, in which the maintaining feature is cut out of action; Fig. 3 a sectional view of the brake valve device in service application position; and Fig. 4 a sectional view of the brake valve device in running position.

As shown in the drawing, the equipment may comprise a fluid pressure brake pipe 1, a brake valve device 2, a main reservoir 3, and a brake pipe pressure maintaining valve device 4.

The brake valve device 2 may comprise a casing having a valve chamber 5, containing the usual rotary valve 6 adapted to be operated by a handle 7. An equalizing discharge valve device is mounted in the casing and comprises a piston 8, having chamber 9 at one side connected to the brake pipe 1 and the chamber 10 at the opposite side connected to passages 11 and 12, leading to the seat of the rotary valve 6.

The piston 8 is adapted to operate the usual brake pipe discharge valve 13.

The maintaining valve device 4 may comprise a casing containing a flexible diaphragm 14 having the chamber 15 at one side connected through pipe 16 with the usual equalizing reservoir 17. The chamber 18 at the opposite side of the diaphragm is connected through a pipe 19, containing a non-return check valve 20, with the brake pipe 1. Operatively connected to diaphragm 14 is a valve 21, contained in valve chamber 22, and controlling communication from valve chamber 22 to chamber 18, said valve chamber being connected to a pipe and passage 23, leading to the seat of the rotary valve 6.

The usual feed valve device 24, supplies fluid under pressure from the main reservoir 3 at a reduced pressure to pipe and passage 25, leading to the seat of rotary valve 6, and in running position of the brake valve device, fluid at the reduced feed valve pressure is supplied to the brake pipe 1.

In operation, a service application of the brakes may be effected in the usual manner by turning the brake valve handle to service position, as shown in Fig. 3. In this position fluid under pressure is vented from the equalizing reservoir side of the equalizing piston 8 and the piston is operated by the higher brake pipe pressure in chamber 9 to open the discharge valve 13 and thereby cause the venting of fluid from the brake pipe.

When the desired reduction in pressure is obtained the brake valve handle is turned to lap position and then, if it is desired to maintain the brake pipe pressure constant at the predetermined reduced pressure, the rotary valve 6 is turned to the maintaining position, as shown in Fig. 1.

In this position, communication from the chamber 10 to the equalizing reservoir 17 is cut off and fluid at the predetermined reduced pressure is bottled up in the equalizing reservoir. If the brake pipe pressure should reduce by leakage or otherwise, below the predetermined pressure in the equalizing reservoir, the diaphragm 14 of the Patented May 1, 1928.

1,668,010

UNITED STATES PATENT OFFICE.

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

FLUID-PRESSURE BRAKE.

Application filed August 30, 1926. Serial No. 132,338.

This invention relates to fluid pressure brakes and more particularly to a brake equipment of the type having means for maintaining the brake cylinder pressure against leakage during a service application of the brakes.

In a prior application of Clyde C. Farmer and Thomas H. Thomas, Serial No. 79,542, filed January 6, 1926, means are disclosed for controlling and maintaining the pressure in the brake cylinder during a service application of the brakes.

According to the application above referred to, when releasing the brakes directly, the brake cylinder exhaust is controlled by the slide valve of the triple valve device, and when a service application of the brakes is made, if leakage from the brake cylinder should occur, fluid is supplied from a maintaining reservoir to the brake cylinder to compensate for the leakage.

If the brake cylinder leakage should be sufficient to cause a drop in pressure in the maintaining reservoir to equal that in the auxiliary reservoir, then further brake cylinder leakage would cause a drop in the auxiliary reservoir as well as in the maintaining reservoir, since the two reservoirs are separated only by a check valve, which permits flow from the auxiliary reservoir to the maintaining reservoir.

The triple valve piston being subject to the opposing pressures of the brake pipe and the auxiliary reservoir, if the auxiliary reservoir pressure should fall below that in the brake pipe, the triple valve piston would be shifted to release position and would consequently cause an undesired release of the brakes.

The principal object of my invention is to provide means for preventing a reduction in auxiliary reservoir pressure and the consequent release of the brakes under the above circumstances.

In the accompanying drawing, the single figure is a diagrammatic sectional view of a brake equipment embodying my invention.

As shown in the drawing, the equipment may comprise a triple valve device 1, having associated therewith a maintaining or control portion 2, a closing valve portion 3, a check valve portion 4 and a brake cylinder 5.

The triple valve device 1 may comprise a casing having a piston chamber 6 connected to the usual brake pipe 7 and containing a piston 8, a main slide valve 9, and an auxiliary slide valve 10 operable by the piston 8 and contained in valve chamber 11.

The maintaining or control portion 2 may comprise a casing, having a valve chamber 13, containing a slide valve 12, adapted to be operated by variations in fluid under pressure on the diaphragm heads 14, 15, and 16, which diaphragm heads provide a chamber 17 connected to the emergency reservoir 18, a chamber 19 connected to atmosphere, a valve chamber 13 connected to the brake cylinder 5, and a chamber 20 connected to the auxiliary reservoir 21.

The closing valve portion 3 may comprise a casing having a diaphragm head 22, separating a chamber 23 at one side, from a chamber 24 at the opposite side. Chamber 23 is in constant communication with the auxiliary reservoir 21, while chamber 24 communicates with the maintaining reservoir 25, in service or service lap position of the triple valve device 1.

Diaphragm head 22 is adapted to operate a valve 26, which valve controls communication between chamber 24 and chamber 27 and thereby the supply of fluid under pressure from the maintaining reservoir 25 to the maintaining or control portion 2.

The check valve portion 4 may comprise a casing having a chamber 28 containing a diaphragm head 29 connected to a bellows diaphragm 30 and adapted to operate a slide valve 31 contained in valve chamber 32, the purpose of the check valve portion being to prevent a decrease in the pressure of fluid in the emergency reservoir 18 when effecting a service application of the brakes.

In operation, to initially charge the brake equipment, fluid under pressure in the brake pipe 7 flows into piston chamber 6 of the triple valve device 1, thence through passage 33, past ball check valve 34 and through passage 35 into valve chamber 11, which is in constant communication with the auxiliary reservoir 21 through passages 36, 37, and 38, and pipe 39.

Fluid at auxiliary reservoir pressure is constantly supplied to chamber 20, of the maintaining or control valve device 2, through passage 37. Fluid from the auxiliary reservoir 21 is also supplied to chamber auxiliary reservoir 21, prevents any drop in the pressure in the valve chamber 11 of the triple valve device 1, since said chamber constantly communicates with the auxiliary reservoir 21. This insures that the triple valve device 1 will remain in its service lap position unless changed by brake pipe control.

To release the brakes after a service application, the pressure of the fluid in the brake pipe is increased in the usual manner, causing the triple valve device 1 to be moved to release position in which the auxiliary reservoir 21 and maintaining reservoir 25 are recharged, and the brake cylinder 5 is connected to the atmospheric port 52, as hereinbefore described.

With the fluid under pressure vented from the brake cylinder 5 and chamber 13 of the maintaining or control portion 2, and the auxiliary reservoir pressure restored, the maintaining or control valve portion 2 resumes its normal position in which the connection between passage 60 and chamber 13 is cut off.

The auxiliary reservoir and maintaining reservoir pressures being restored and being substantially equal, the closing valve portion 3 also resumes its normal position in which the valve 26 is closed.

Having now described my invention, what I claim as new and desire to secure by Letters Patent, is:—

1. In a fluid pressure brake, the combination with a brake cylinder and auxiliary reservoir, of a maintaining reservoir, a maintaining valve device for controlling the supply of fluid from said maintaining reservoir to the brake cylinder, and means subject to the opposing pressure of the maintaining reservoir and the auxiliary reservoir, for controlling communication through which said maintaining valve device supplies fluid from the maintaining reservoir to the brake cylinder.

2. In a fluid pressure brake, the combination with a brake cylinder and auxiliary reservoir, of a maintaining reservoir, a maintaining valve device for controlling the supply of fluid from said maintaining reservoir to the brake cylinder, a spring, and means subject to the opposing pressures of the maintaining reservoir and the auxiliary reservoir and said spring for controlling communication through which fluid from the maintaining reservoir is supplied to said maintaining valve device.

3. In a fluid pressure brake, the combination with a brake cylinder, brake pipe, and auxiliary reservoir, of a valve device subject to the opposing pressures of the auxiliary reservoir and brake pipe for controlling the supply of fluid from the auxiliary reservoir to the brake cylinder, a maintaining reservoir, a maintaining valve device for controlling the supply of fluid from the maintaining reservoir to the brake cylinder, and means subject to the opposing pressures of the maintaining reservoir and the auxiliary reservoir for controlling the supply of fluid from the maintaining reservoir to the maintaining valve device.

4. In a fluid pressure brake, the combination with a brake cylinder, brake pipe, and auxiliary reservoir, of a valve device subject to the opposing pressures of the auxiliary reservoir and brake pipe for controlling the supply of fluid from the auxiliary reservoir to the brake cylinder and the exhaust of fluid from the brake cylinder, a maintaining reservoir, and a valve device subject to the opposing pressures of the maintaining reservoir and the auxiliary reservoir for controlling communication through which fluid is supplied from the maintaining reservoir to said maintaining valve device.

In testimony whereof I have hereunto set my hand.

CLYDE C. FARMER.